(12) United States Patent
Sato et al.

(10) Patent No.: US 8,274,980 B2
(45) Date of Patent: Sep. 25, 2012

(54) ETHERNET LINK AGGREGATION

(75) Inventors: Masakazu Sato, Tokyo (JP); Satoshi Nakajima, Tokyo (JP); Kazunari Suzuki, Chiba-ken (JP)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 12/393,727

(22) Filed: Feb. 26, 2009

(65) Prior Publication Data

US 2010/0215042 A1  Aug. 26, 2010

(51) Int. Cl.
 *H04L 12/56* (2006.01)
(52) U.S. Cl. ............... 370/392; 370/465; 370/474
(58) Field of Classification Search .............. None
See application file for complete search history.

(56) References Cited

U.S. PATENT DOCUMENTS

| | | | |
|---|---|---|---|
| 2003/0128706 A1* | 7/2003 | Mark et al. | 370/395.1 |
| 2004/0162994 A1* | 8/2004 | Cohen et al. | 713/201 |
| 2005/0276263 A1 | 12/2005 | Suetsugu et al. | |
| 2007/0230486 A1* | 10/2007 | Zafirov | 370/401 |
| 2008/0214307 A1* | 9/2008 | Arbogast et al. | 463/42 |
| 2009/0067440 A1* | 3/2009 | Chadda et al. | 370/401 |
| 2009/0225752 A1* | 9/2009 | Mitsumori | 370/390 |

FOREIGN PATENT DOCUMENTS

| | | |
|---|---|---|
| JP | 2004-274441 | 9/2004 |
| JP | 2005-130408 | 5/2005 |

OTHER PUBLICATIONS

English Translation of JP 2005-130408.*
English Translation of JP 2004-274441.*

* cited by examiner

*Primary Examiner* — Gregory Sefcheck
*Assistant Examiner* — Salvador E Rivas
(74) *Attorney, Agent, or Firm* — Scully, Scott, Murphy & Presser, P.C.; William Steinberg, Esq.

(57) ABSTRACT

A system and method of transmitting data across a link aggregation group, the method comprises: receiving a packet sourced from a client having a MAC header and an IP header at an input port of a first upstream switch for transmission from the first upstream switch along a link aggregation and at least two down stream switches to a server, said MAC header having a Destination MAC address and a Source MAC address, and the IP header having a Source IP address and a Destination IP address; changing the destination MAC address from a down stream destination to another down stream destination; sending the packet through a first link aggregation to a first down stream switch; using a hash calculation for changing the Source MAC address of the packet in the first down stream switch to a new address; sending the packet through a second link aggregation to a second down stream switch having an address; and sending the packet from the second down stream switch to a server having a server address.

12 Claims, 4 Drawing Sheets

ETHERNET LINK AGGREGATION

BACKGROUND OF THE INVENTION

1. Field of the Invention

The present invention relates in general to data processing systems and more particularly to switching of data transmissions in a network.

2. Background Information

In a networking environment, it is typical that a plurality of devices will be linked together for the purpose of transmitting data from one device to another in the network. In a large network, it would be uneconomical to provide a specific data link connecting each device to each of the other devices in the network. In order to provide connectivity from each device to each of the other devices in the network in an efficient and economical manner, a plurality of methods have been developed.

One known method of distributing data between devices within a network is through switches. Switches may be utilized within the network to receive data from a plurality of devices and distribute the data to a plurality of devices to reduce the amount of data lines required to distribute data. To utilize switches to communicate between devices, each device has a specific address. For example, in an Ethernet switching environment, each device in the network has a Media Access Control (MAC) address, which uniquely identifies the device in the network. Frames of data are delivered to a MAC Destination Address (DA) and senders are recognized by a MAC Source Address (SA). Each switch, and each port on a switch, supports a finite number of MAC addresses. Ideally, the overall number of MAC addresses distributed by a switch should be large, so the switch can support a large number of devices.

In addition to supporting a large number of devices, a switch should comprise the ability to handle the transfer of large amounts of data through a network. For a switch to quickly handle the transfer of large amounts of data, link aggregation is utilized. Link aggregation allows a switch to support a higher bandwidth interface which increases the rate of data transfer. Link aggregation is a technique that allows parallel physical links between switches or between a switch and a server to be used simultaneously which multiplies the bandwidth between the devices. Link aggregation may be further defined as a method of grouping physical link segments of the same media type and speed, and treating them as if they are part of a single, logical link segment. For example, two 100 Mbps links between switches may be grouped into a link aggregation and treated as a single 200 Mbps link to create a higher bandwidth interface between the two switches.

SUMMARY OF THE INVENTION

In order to expand bandwidth as scheduled in the Gigabit Ether Channel (GEC) and Fast Ether Channel (FEC), traffic needs to be evenly distributed among each bundled Ethernet port. For this purpose, two methods are implemented: a) a method to determine an output port by a value obtained by hashing the source or destination MAC address of a packet and b) a method to determine an output port by a value obtained by hashing the source or destination IP address of a packet. However, Ethernet operates in Layer 2 of the Open Systems Interconnection (OSI) network layer protocol, so that although the method to refer to the MAC address is common, there is a great deal of equipment that cannot refer to the IP address.

In the method to determine the output port using only the MAC address, the MAC address needs to be fully distributed among packets. However, when the aforementioned equipment is used under a network environment in which only a single or a few MAC addresses are used for both source and destination, a problem arises in that the hash effect does not work and the load cannot be distributed among links.

In the present invention, load sharing among links is obtained by using a first upstream switch which refers only to a MAC address as a load sharing algorithm among output ports in Link Aggregation under a network environment in which the source and destination MAC address are single or only a few. In the present invention the source MAC address is rewritten within a first upstream switch and randomized. The MAC address used for randomization is selected from a pool of a plurality of MAC addresses which are reserved in the first upstream switch. In a next occurring first down stream switch the output port is determined by a hash value of the source MAC address, which allows load sharing in the link between the first down stream switch and a second downstream switch. When traffic flows from a terminal connected top a first upstream switch to a server connected to a second downstream switch, the first down stream switch balances the links between the first and second down stream switches. In this invention, the translation of MAC addresses are implemented on the upstream switch of the direction of traffic flow.

Randomizing the MAC addressed in the first upstream switch can be by generating random numbers for each packet, or by a hash value with the IP address being the key.

In one embodiment of the invention, there is disclosed a method of transmitting data across a link aggregation group comprising:

receiving a packet sourced from a client having a MAC header and an IP header at an input port of a first upstream switch for transmission from said first upstream switch along a link aggregation and at least two down stream switches to a server, said MAC header having a Destination MAC address and a Source MAC address, and said IP header having a Source IP address and a Destination IP address;

changing said destination MAC address from a down stream destination to another down stream destination;

sending said packet through a first link aggregation to a first down stream switch;

using a hash calculation for changing said Source MAC address of the packet in the first down stream switch to a new address;

sending said packet through a second link aggregation to a second down stream switch having an address; and sending said packet from said second down stream switch to a server having a server address.

In another embodiment there is disclosed a system of transmitting data across a link aggregation group comprising:

a first upstream switch for receiving a packet sourced from a client having a MAC header and an IP header for transmission from said first upstream switch along a link aggregation and along at least two down stream switches to a server, said MAC header having a Destination MAC address and a Source MAC address, and said IP header having a Source IP address and a Destination IP address;

means for changing said destination MAC address from a down stream destination to another down stream destination;

a first down stream switch coupled to said first upstream switch through a first link aggregation for receiving said packet;

calculating means for changing said Source MAC address of the packet in the first down stream switch to a new address; and a second down stream switch having an address coupled to said first down stream switch through a second link aggregation; and a plurality of servers each having a specific address coupled to said second down stream switch.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
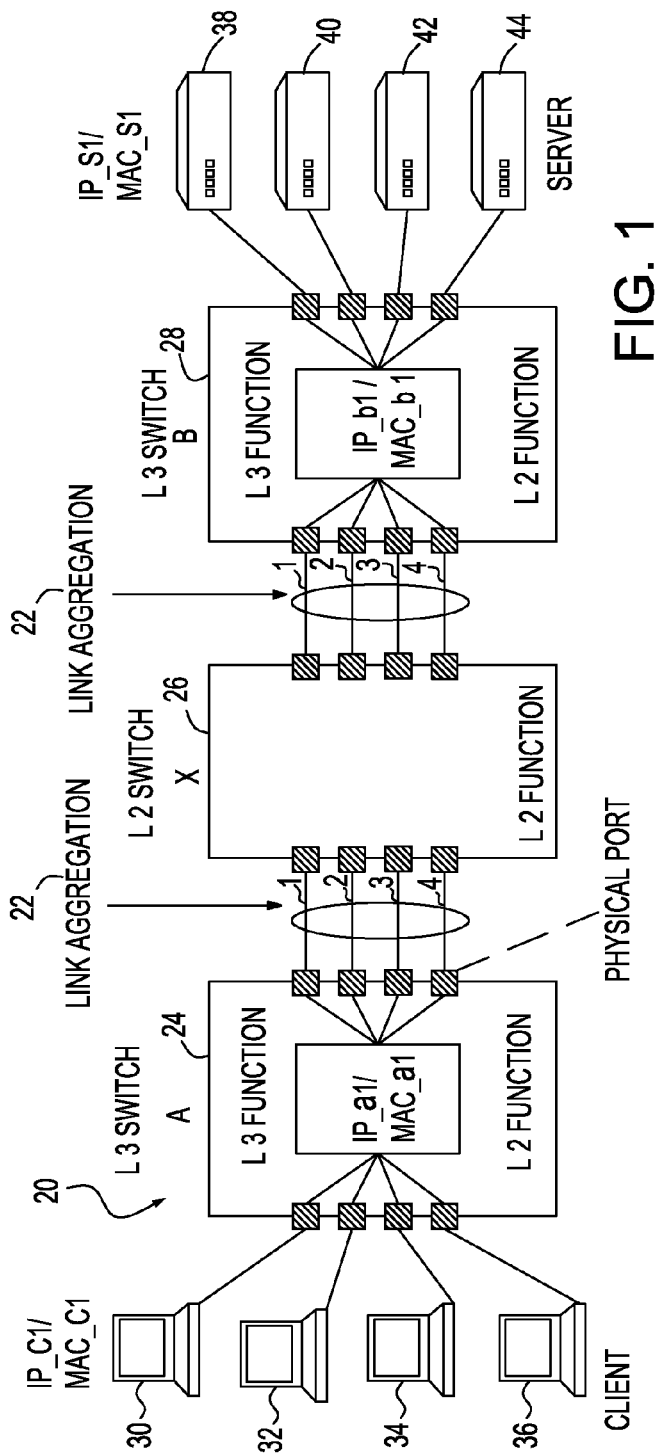
FIG. 1 is a block diagram of a link aggregation between two hosts for transmitting data between the hosts which may be utilized to implement the method and system of the present invention.

Referring to FIG. 1, there is shown a high level block diagram illustrating a network 20 which may be utilized to implement the method and system of the present invention. As illustrated, network 20 may be constructed utilizing a link aggregation 22 for transmitting data between switches 24, 26 and 28. Software which directs the flow of the packets can be a flow transmission controller (not shown) which may be provided at switches 24, 26 and 28 for storage in the switches via a variety of signal-bearing media which include, but not limited to storage media such as a floppy diskette. Switches 24, 26 and 28 can include a permanent storage medium (not shown) such as read-only memory (ROM) for storing the software and a temporary storage medium (not shown) such as random access memory (RAM) for supporting the implementation of the software.

Switches 24, 26 and 28 can be Ethernet switches. Each switch is networked with a plurality of devices where switch 24 is connected to devices 30, 32, 34 and 36 and switch 28 is connected to devices 38, 40, 42 and 44. In an example embodiment, here disclosed devices 30, 32, 34 and 36 represent a plurality of client devices such as computers e.g., PC, mobile or lap top computers, persona digital assistance devices, etc. Each server device 38-44 is further assigned a unique IP/MAC address as well and the plurality of devices 38, 40, 42 and 44 represent a plurality of servers.

Referring to FIG. 1, the link aggregation 22 is illustrated as having four links. While not required, it is preferable that each of the links illustrated has similar bandwidth properties. It is desirable to be able to bundle a number of physical links together to form a link aggregation group for optimizing bandwidth between the switches. Each link illustrated is bundled into link aggregation 22 and appear as a MAC interface to higher layer protocols and, therefore, may be utilized with a plurality of networking protocols.

Still referring to FIG. 1, the four links illustrated are not restricted to contiguous physical numbering or starting with link number 1. For example, the physical link numbers may be identified as links 1, 2, 3, 4 where the link numbers are contiguous and start with link number 1, or the link numbers may be identified as links 3, 5, 6, 12 where the link numbers are not contiguous. However, in both cases, there is a first link, a second link, a third link and a fourth link in the link aggregation 22 regardless of the actual link number. For purposes of illustration hereon, the links utilized are contiguous and start with a link number 1. However, each of the applications of links numbers may be implemented with non-contiguous numbers which may or may not start with link number 1.

The Ethernet switches are configured according to a specific protocol where switch 26 is configured, for example, according to Layer 2 protocol such as IEEE802.3, and switches 24 and 28 are configured according to Layer 3 protocol. The various Ethernet ports of the switches are used as if they are a single Ethernet port for expanding the link bandwidth.

Figure 2:
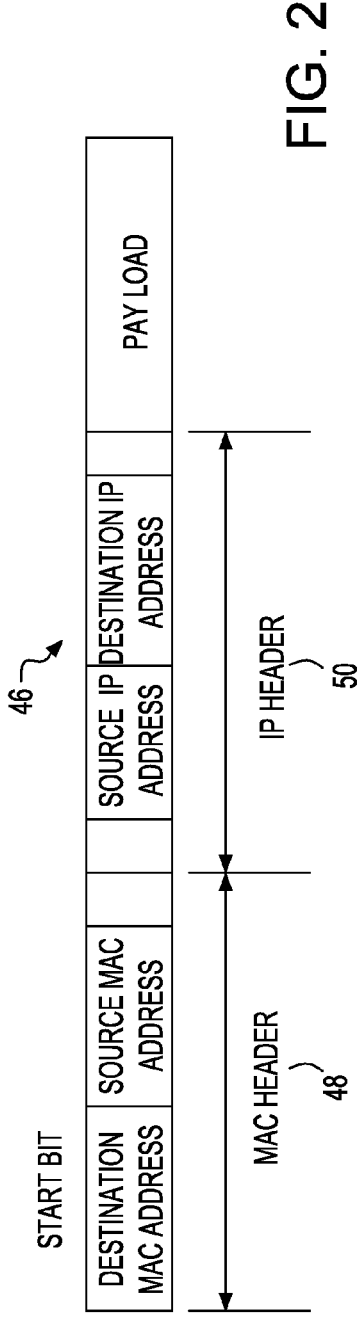
FIG. 2 is a schematic diagram representing a format for a packet.

Referring to the format of a packet as shown in FIG. 2, packet 46 has a header and a pay load. The header has a group of bits 48 designated as MAC header and another group of bits 50 designated as IP header. The MAC header has two groups of bits where the first is Destination MAC address and the second is Source MAC address. The IP header has two groups of bits where the first is Source IP address and the second is Destination IP address. The MAC address specifies a destination of the Layer 2 protocol, and the IP address specifies a destination of the Layer 3 protocol, the IP protocol.

Figure 3:
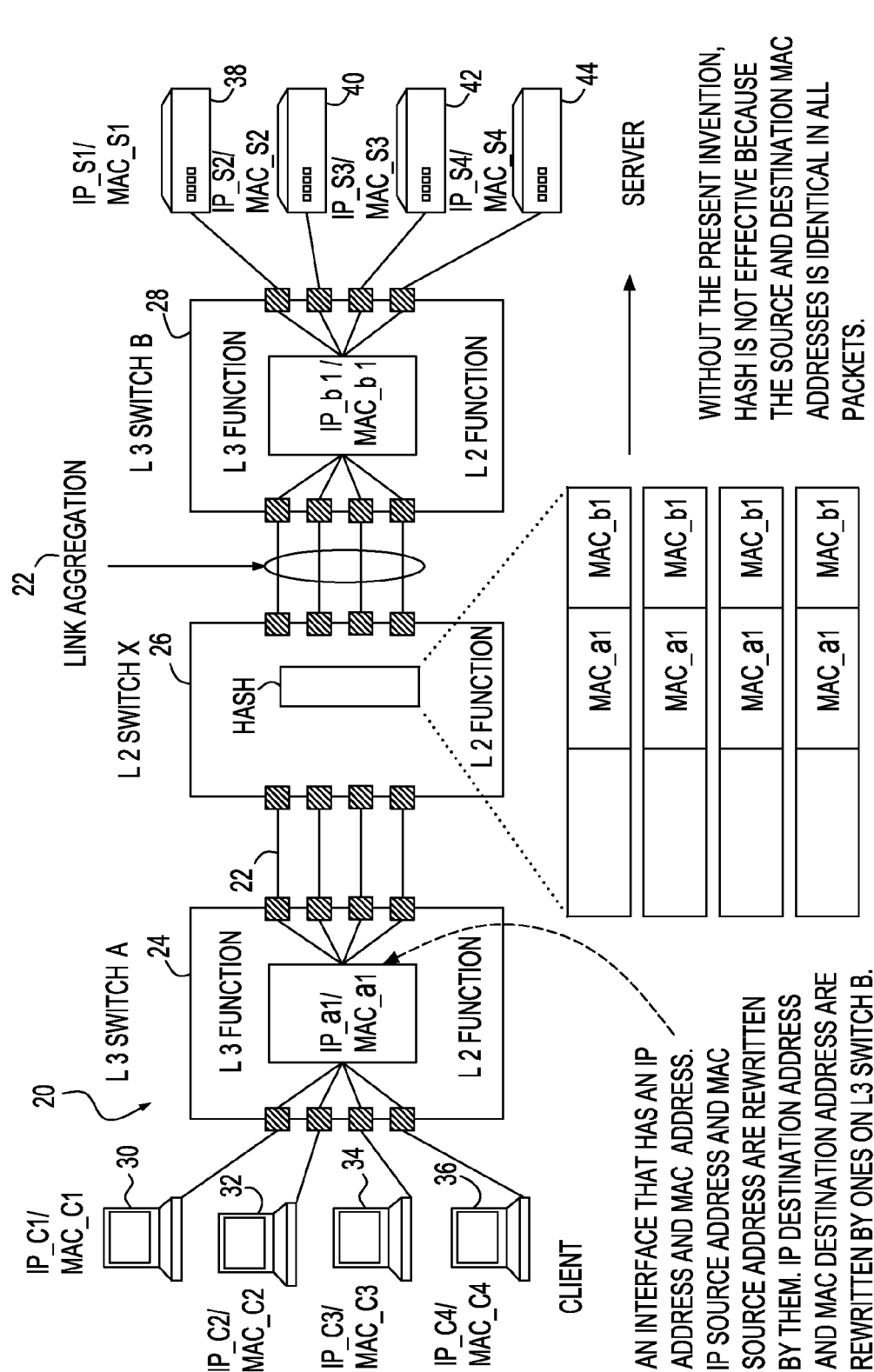
FIG. 3 is a block diagram illustrating the method of using hash calculation based on MAC address.

Referring to FIG. 3, in switch 24, the destination MAC address is re-written in the packet header to be the address of the switch 28 (MAC_b1), and the source address is re-written in the packet header to be the address of the switch 24 (MAC_a1), according to the normal L3 switch function. Without the present invention, hash function on Switch X cannot balance the load on the links of the channel because these packets have the same MAC addresses as described in FIG. 3. The present invention rewrites the source MAC address to be randomized using the algorithm described in the next section. The packet then advances to switch 26 where a hash calculation is performed using a prior art hash algorithm. The hash calculation is necessary to distribute traffic among the links. The hash calculation method is based on the MAC address in one example embodiment. Since the source MAC addresses are distributed, the hash function is applied to the MAC address functioning as the hash key to generate a unique string of digits. In switch 24, an interface that has an IP address and a MAC source address. The IP source address and the MAC source address are rewritten by them. The IP destination address and the MAC address are rewritten by ones on L3 in switch B, 28. Absent the present invention, hash is not effective because the source and destination MAC address is identical is all packets.

Figure 4:
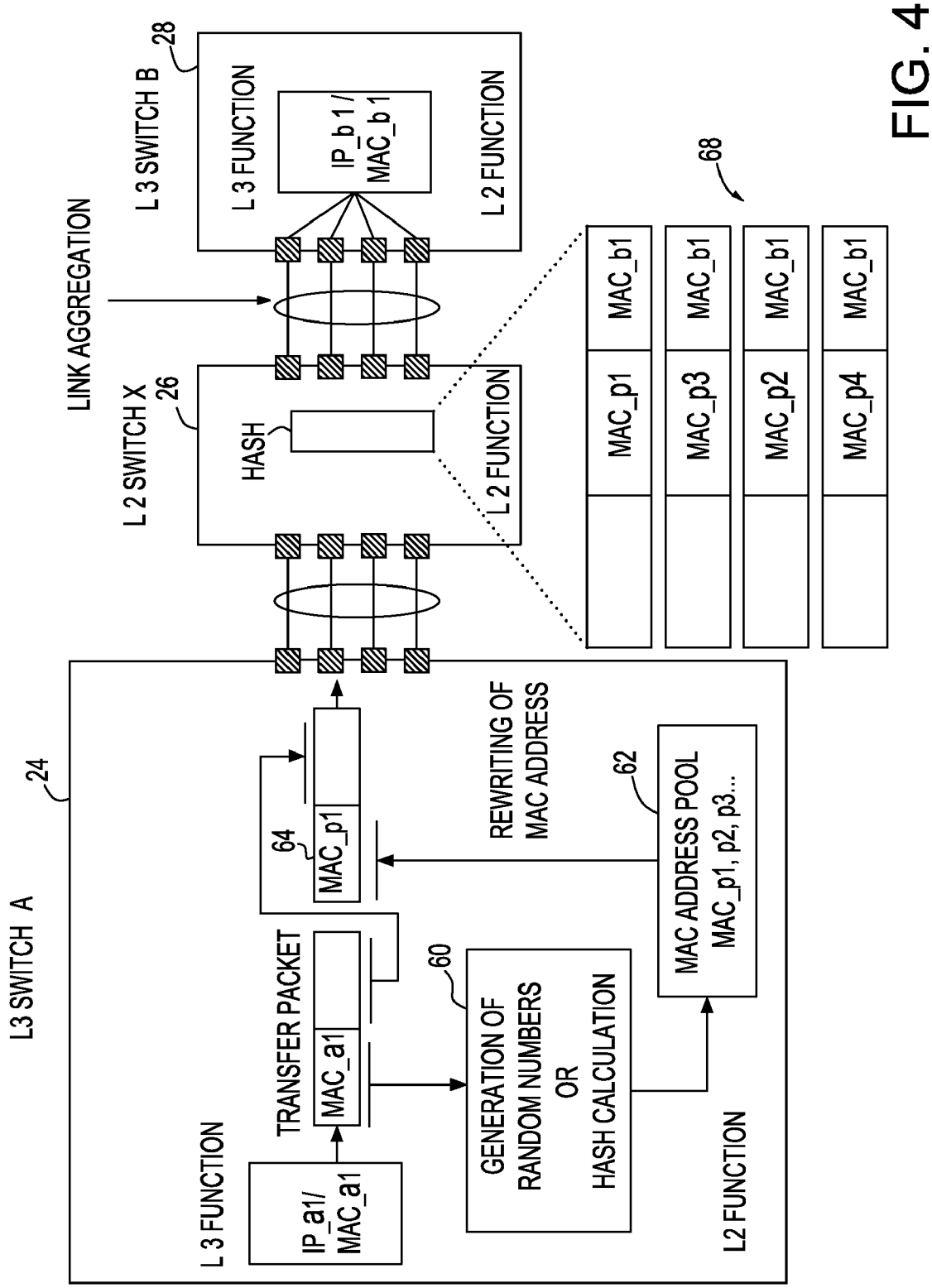
FIG. 4 illustrates a method for using MAC address.

Referring to FIG. 4, there is shown a method of providing source MAC address in the header of a packet. A packet sourced from a client device having source and destination IP addresses in an IP header is received by switch 24. The source or destination IP, or both addresses are used as the key for a hash calculation 60. As an alternative, a random number generator can be used. The resultant of the hash calculation or random number generator is used to rewrite the source MAC address at 62, and this new source MAC address is put into packet 64. When the hash is used, the inputs are two parameters, IP_Cn (n=0, 1, 2 . . . ) and IP_Sm (m=0, 1, 2 . . . ). Assuming H(x,y) as the hash function, the index of the MAC table, which includes multiple MAC addresses, is given by H(IP_Cn, IP_Sm). The index calculated is the same if IP_Cn and IP_Sm are the same. However, these addresses are distributed when multiple terminals and servers are sources and destinations of a traffic.

The destination MAC address is the server (one of servers 38-44), it is not the MAC address of the switch 28. The packet advances to switch 26 where both the source IP address and the destination IP address are used as keys to perform a hash calculation to randomize the source MAC address. Table 68 in FIG. 4 shows four randomized source packet headers. In the embodiment disclose, the hash function with the MAC addresses as the key is used to distribute the destination MAC addressees.

Figure 5:
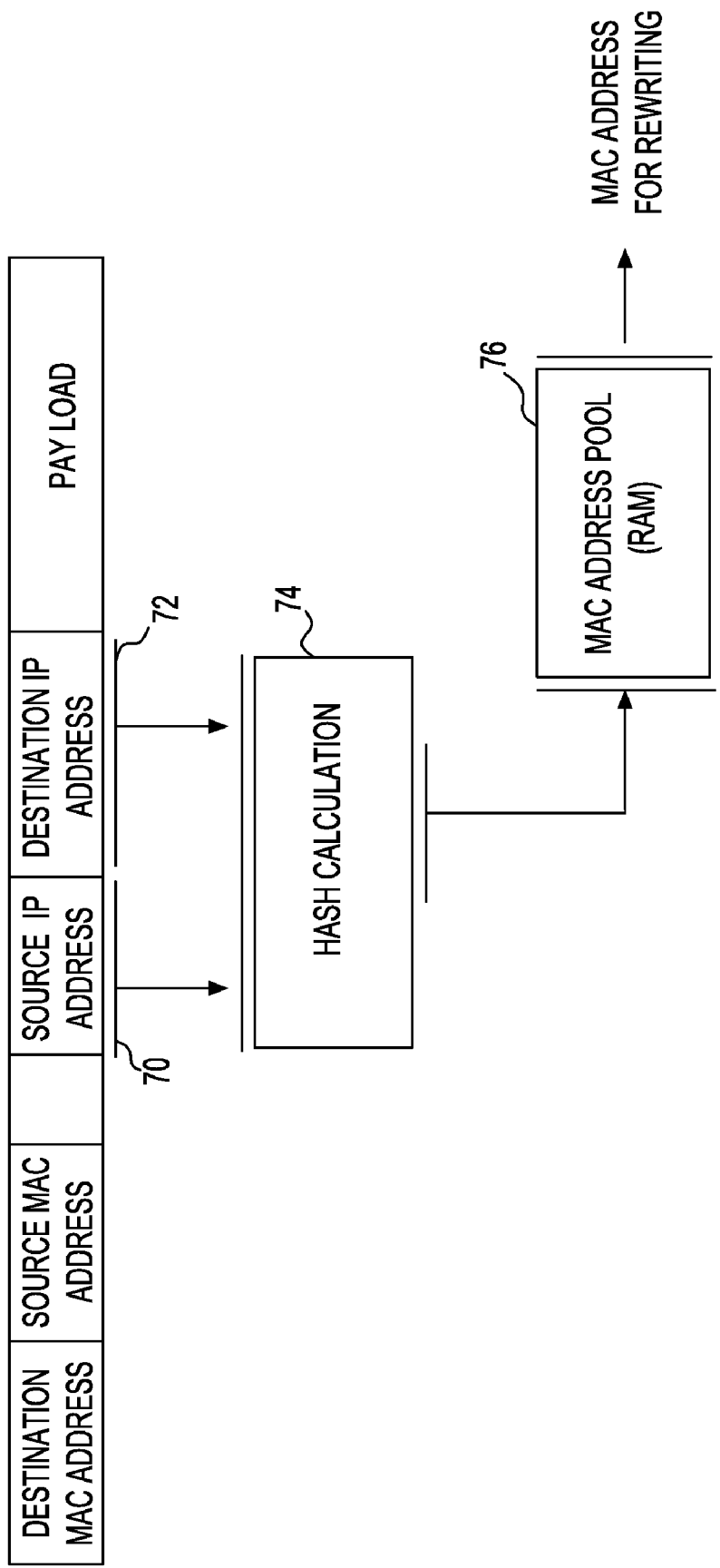
FIG. 5 illustrates a method of calculating hash to provide that the same flow does not pass through other links in the link aggregation and that the flow goes to the same output port.

Referring to FIG. 5, the hash 74 is calculated with the source IP address 70 and destination IP address 72 being keys. The hash calculation is used to generate a MAC address pool 76. The MAC pool address is used to provide the MAC address for rewriting. The same flow, communication between the same IPs, outputs the same hash value; and the same flow, the communication between the same IPs, outputs the same MAC address.

In the embodiment disclosed, a function is implemented in end switches 24 and 28, and intermediate switch 26 is configured to adopt a MAC address based load sharing algorithm so that switch 26 cannot be changed. Load sharing capability of the channel between switches 24 and 26 is also obtained by the function of switch 24 as describe above, or by a hash based on IP address. Since correspondence between the IP address and randomized MAC address is uniquely determined, the port selected by the flow is fixed and the packet order can be maintained.

Although a few examples of the present invention have been shown and described, it would be appreciated by those skilled in the art that changes might be made in these embodiments without departing from the principles and spirit of the invention, the scope of which is defined in the claims and their equivalents.

What is claimed is:

1. A method of transmitting data across a link aggregation group comprising:
    receiving a packet sourced from a client having a MAC header and an IP header at an input port of a first upstream switch for transmission from said first upstream switch along a link aggregation and at least two down stream switches to a server, said MAC header having a Destination MAC address and a Source MAC address, and said IP header having a Source IP address and a Destination IP address;
    changing said destination MAC address from a down stream destination to another down stream destination;
    sending said packet via a first output port through a first link aggregation to a first down stream switch;
    using, using a random number generator, for changing said Source MAC address of the packet in the first down stream switch to a new address, said random number generator generating a pool of source MAC addresses; and selecting from said pool said new Source MAC address;
    sending said packet via a second output port through a second link aggregation to a second down stream switch having an address; and
    sending said packet from said second down stream switch to a server having a server address, wherein each said changed source MAC identifier being uniquely determined based an IP address indicated in a packet header to ensure that each packet of a communication flow having a same source and destination IP address are transmitted over a same output port.

2. The method of claim 1 further comprising: using a hash calculation for changing said Destination MAC address from one down stream destination to another down stream destination.

3. The method of claim 2 further comprising: selecting said address of said server as the destination address.

4. The method of claim 3 further comprising: using both the source IP address and the destination IP address as keys for the hash calculation.

5. A system of transmitting data across a link aggregation group comprising:
    a first upstream switch for receiving a packet sourced from a client having a MAC header and an IP header for transmission from said first upstream switch along a link aggregation and along at least two down stream switches to a server, said MAC header having a Destination MAC address and a Source MAC address, and said IP header having a Source IP address and a Destination IP address;
    means for changing said destination MAC address from a down stream destination to another down stream destination;
    a first down stream switch coupled to first output ports of said first upstream switch through a first link aggregation for receiving said packet;
    calculating means for changing, using a random number generator, said Source MAC address of the packet in the first upstream stream switch to a new address, said random number generator generating a pool of Source MAC addresses from which the new address is selected; and
    a second down stream switch having an address coupled to second output ports of said first down stream switch through a second link aggregation; and
    a plurality of servers each having a specific address coupled to said second down stream switch, wherein each said changed source MAC identifier being uniquely determined based an IP address indicated in a packet header to ensure that each packet of a communication flow having a same source and destination IP address are transmitted over a same first and second output port.

6. The system of claim 5 further comprising: using a hash calculation for changing said destination MAC address from one down stream destination to another down stream destination.

7. The system of claim 5 further comprising:
    selecting said address of said server as the destination address.

8. The system of claim 7 further comprising: using both the source IP address and the destination IP address as keys for the hash calculation.

9. The system of claim 5 wherein links in said link aggregation have similar bandwidth properties.

10. The system of claim 9 wherein said first switch and said second down stream switch are configured according to Layer 3 protocol.

11. The system of claim 10 wherein said first down stream switch is configured according to Layer 2 protocol.

12. A system for communicating network packets between one or more first and one or more second computing devices, each said one or more first and second computing devices having an associated media access card (MAC) address identifier, said system comprising:
    a first network switch intermediate said first and second computing devices having a plurality of input ports for receiving packets over a first set of aggregated communication links and a plurality of output ports over which said packets are transmitted over a second set of aggregated communication links, said first network switch adapted to select an output port from among said plurality of output ports based on a source MAC identifier included in a received packet;

an upstream network switch connecting said first computing device to respective one or more input ports of said first network switch via said first set of aggregated communication links, said upstream network switch receiving said network packets destined for a second computing device and forwarding said packets to said first network switch over said first set of aggregated communication links;

device at said upstream network switch for selecting, from among a plurality of randomized source MAC identifiers, a randomized source MAC identifier, said device rewriting, for each received network packet, a source MAC identifier in a network packet header with a selected randomized source MAC identifier prior to transmitting said packet to said first network switch; and, a downstream network switch connecting one or more said second computing devices to respective said one or more plurality of output ports over said second set of aggregated communication links and forwarding said network packets received over said second set of aggregated links to a destination second computing device;

wherein each said randomized source MAC identifier being uniquely determined based an IP address indicated in a respective network packet header to ensure that packets having a same source and destination IP addresses reach its destined second computing device over a same output port.

* * * * *